Figure 1:
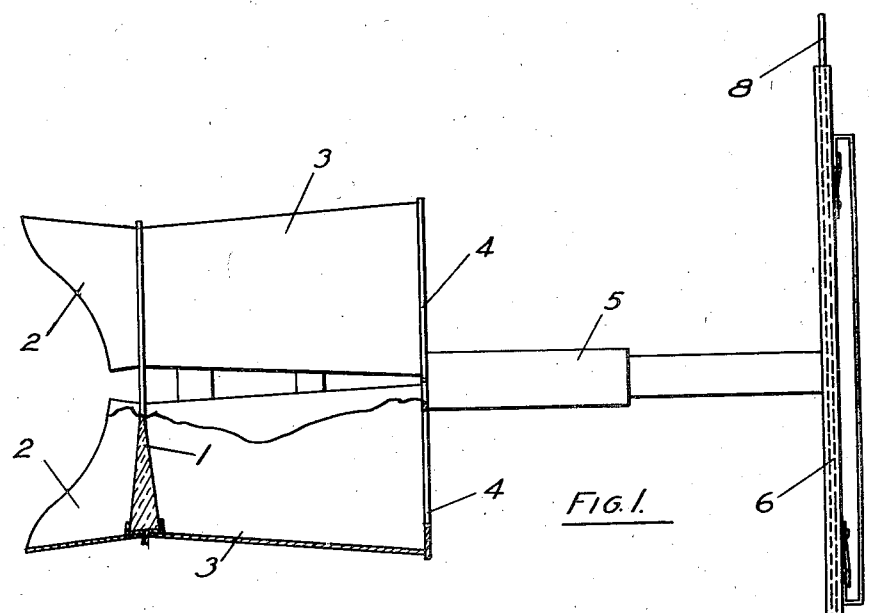

May 18, 1937. B. W. KELLY 2,080,721

METHOD OF TESTING EYES AND APPARATUS THEREFOR

Filed May 27, 1932

Benjamin W. Kelly
INVENTOR.

BY
ATTORNEYS.

Patented May 18, 1937

2,080,721

UNITED STATES PATENT OFFICE 2,080,721

METHOD OF TESTING EYES AND APPARATUS THEREFOR

Benjamin W. Kelly, Des Moines, Iowa, assignor to Keystone View Company, Meadville, Pa., a corporation of Pennsylvania Application May 27, 1932, Serial No. 613,878

5 Claims. (Cl. 88—20)

In the examination of eyes it is desirable to test the eyes in various ways for various weaknesses. The present invention is designed to simplify some of these tests. In nearly all persons one or the other eye is more or less dominant. In many eyes there are blind spots, or portions of the retina that have no vision. These blind spots may be in the center of the retina, may be in concentric zones or at different points in the retina. In carrying out my invention I use a special form of stereoscope and place before each eye specially selected and prepared slides of different colors, preferably complementary colors, so placed that light from only one colored slide may enter each eye, or by certain movements of the slides, two colors may be made to enter each eye, if desired. Where the eyes are normal these colors blend so that the observer sees a single color which is a blend of the two. If the two colors are exactly complementary, the observed blended color will be a neutral grey. If one eye is slightly dominant the fused color will be tinted by the color entering the dominant eye. Should the portion of the retina most sensitive to light, called the "yellow spot" or "macula lutea" be partially defective in one or both eyes while the remainder of the retina, or so-called peripheral region is normal the blended color will appear to be grey over the edges of the field of vision only while the center of the field will be tinted with one or the other of the colors, depending upon which eye is most nearly perfect in the macular region. On the other hand, if the peripheral region of either or both eyes should be defective while the macular regions are normal, the edges of the field of vision will be tinted with one or the other of the colors while the central portion of the field will appear to be grey. Where there is no sight whatever in some portion of either retina, whether it be in the macular region, or the peripheral region, the defect will cause a definite colored spot to appear in the blended grey field in a position and of a size corresponding to the position and size of the actual "blind spot" in the retina.

For example, where there is a blind spot in the right eye and a blue slide is used before the right eye and its complementary yellow before the left eye, the fused field will appear as a neutral gray except for a definite yellow spot corresponding in size and position to the blind spot in the right retina. That is to say, the blue which falls upon the blind spot of the right retina is not fused with the yellow falling upon the corresponding normal spot on the left retina so that only yellow appears in this portion of the fused field, thus indicating the defect in the eye. These spots may appear at the center, around the margin, or eccentric to the field of vision, depending upon the position of the blind spot on the retina.

Where there is very little vision in one eye there may be no fused field apparent when the two colored slides are used, as indicated above. The fusion may be stimulated by more or less rapid motion of the colored slide before the defective eye, or by slowly moving the two slides back and forth across the slide holder so that the inner ends of the slides, which should touch each other, may appear alternately before each eye, thus stimulating by motion and contrast, the nerve endings of the defective retina.

In some individuals with one eye decidedly defective there is a defect in the fusion faculty which alows them to perceive only the general sensation of color in the fusion field, as above described, and it is highly desirable to discover whether such a patient can fuse on definite forms as well as on colors over the entire field.

As a test for such a condition, I have designed slides of such forms and colors that, when introduced into the slide holder of a properly constructed stereoscope, the patient will see, if sensitive to form fusion, certain shapes which vary as the slides are brought nearer together or farther apart in the slide holder. For example a pair of slides with semicircular ends, one being blue, the other its complementary yellow, when pushed toward each other in the slide holder, appear to first overlap, then to form a grey circle or ball, and finally to form an oblong grey figure. This will be true only if both eyes are sensitive to form. If one eye is defective in this regard, only a blurred figure, or a general sensation of color will be apparent to the patient.

I have illustrated in the accompanying drawing a stereoscope according to my invention and which is adapted for the practice of the method as follows:—

Fig. 1 shows a plan view of a stereoscope, partly in section.

Figure 2:
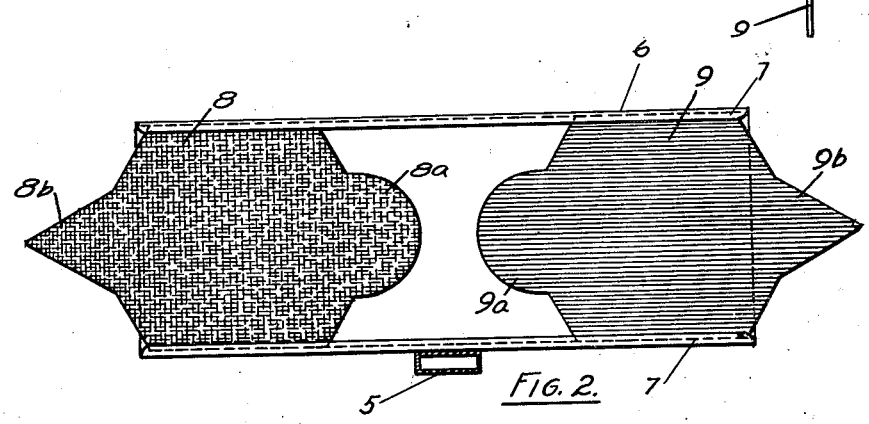

Fig. 2 an elevation of the view holder with views therein.

Figure 3:
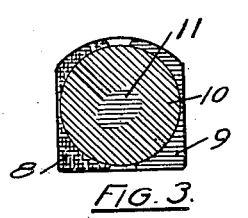

Fig. 3 a fused field as it appears to a user having an eye defect.

Figure 4:
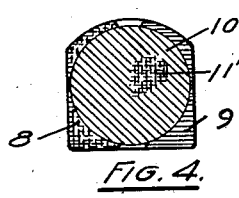

Fig. 4 a similar view showing a slightly different defect.

The stereoscope has lenses 1, a visor 2, barrels 3, and field plates 4. A telescopic guide 5 is secured to the barrels and a view holder 6 is mounted on the guide. The view holder has under-cut guide slots 7 at its top and bottom adapted to receive views, such as 8 and 9. These views, as shown, are yellow and blue, but it will be understood that any different, or complementary colors, may be used, the response of different eyes to different colors differing somewhat. These views have the semi-circular extending ends 8a and 9a respectively at one end and pointed projections 8b and 9b at the opposite ends.

In the use of the stereoscope, as above described, the views are placed in the holder and observed by the user, and the fusion, or lack of fusion reported. If there is a lack of fusion, the dominant eye will immediately be manifest through the color response of the patient, and the other eye may be stimulated by more or less vigorous movements of the slides in front of it, or by a back and forth motion of both slides so that each eye may alternately see each color.

The patient may also be examined as to his response to form by adjusting the views, one to the other. When properly adjusted if there is response to fusion and to form the semi-circular parts 8a and 9a complement each other so as to give the effect of a circle, as 10, having the fused color. In similar manner, the extending points 8b and 9b when arranged at the center may be adjusted to give the fused effect of a diamond form. These narrower and preferably tapered projections on the views are of particular advantage in determining the location of defects relatively to the macula lutea portion of the retina, or the so-called peripheral regions.

Not only is lack of response of one eye, or the other, indicated, both as to color and form, but color blindness and lack of form sensitiveness in one, or the other eye, is, of course, immediately manifest and the eye having such blindness indicated. Blind spots are also indicated, as for instance, if there is a blind spot in the center of the left eye the yellow in the fusion will be absent from the blind spot and a blue spot 11, as indicated in the fused portion 10, Fig. 3, will appear. Likewise, if there is a blind spot in the right eye away from the center of the retina a yellow area 11' will appear in a corresponding position in the fused field. In this way, many defects of the eyes may be very promptly detected.

What I claim as new is:—

1. The method of testing eyes which consists in presenting stereoscopically individually to each eye views having reflected substantially solid color fields of different colors, the adjacent portions of the views being provided with extensions of smaller area than the main portion of the views, and noting for diagnosis the resulting fusions for eye defects in the remaining portions of the fields.

2. The method of testing eyes which consists in presenting stereoscopically individually to each eye views having reflected substantially solid color fields of different colors, the adjacent portions of the views being provided with extensions of smaller area than the main portion of the views, and noting for diagnosis the resulting fusions, and varying the relation of the adjacent portions of the fields to form a fusion overlap distinct from the remaining portions of the fields.

3. The method of testing eyes which consists in presenting stereoscopically individually to each eye views having reflected substantially solid color fields of different colors, the adjacent portions of the views being provided with extensions of smaller area than the main portion of the views, and noting for diagnosis the resulting fusion, and varying the relation of the adjacent portions of the fields to form a fusion overlap distinct from the remaining portion of the fields and varying the fusion overlap.

4. An eye testing device comprising a stereoscope; and complementary views, the adjacent portions of which are provided with extensions of smaller area than the main portion of the views, said views having reflected substantially solid color fields of different colors, said fields having a fusion overlap increasing in width from the adjacent edges and extending only through a portion of the fields.

5. An eye testing device comprising a stereoscope; and complementary views, the adjacent portions of which are provided with extensions of smaller area than the main portion of the views, said views having reflected substantially solid color fields of different colors, said fields having a fusion overlap of at least a portion of the fields; and means varying the views to vary the extent of the overlapping fusion whereby the degree of color sensitiveness of the eye may be measured.

BENJAMIN W. KELLY.